United States Patent
Baert et al.

(10) Patent No.: US 12,546,122 B2
(45) Date of Patent: Feb. 10, 2026

(54) PANEL AND METHOD FOR PRODUCING A PANEL

(71) Applicant: Champion Link International Corporation, The Valley (AI)

(72) Inventors: Thomas Luc Martine Baert, Sint-Martens-Latem (CH); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 162 days.

(21) Appl. No.: 18/690,001

(22) PCT Filed: Sep. 12, 2022

(86) PCT No.: PCT/EP2022/075317
§ 371 (c)(1),
(2) Date: Mar. 7, 2024

(87) PCT Pub. No.: WO2023/036989
PCT Pub. Date: Mar. 16, 2023

(65) Prior Publication Data
US 2024/0384543 A1    Nov. 21, 2024

(30) Foreign Application Priority Data
Sep. 13, 2021 (NL) .................................. 2029176

(51) Int. Cl.
*E04F 15/10* (2006.01)
*E04B 9/04* (2006.01)
(Continued)

(52) U.S. Cl.
CPC .......... *E04F 15/107* (2013.01); *E04B 9/0464* (2013.01); *E04F 13/0866* (2013.01);
(Continued)

(58) Field of Classification Search
CPC .............. E04F 15/107; E04F 15/02038; E04F 2290/043; E04F 13/0889; E04F 13/0866;
(Continued)

(56) References Cited

U.S. PATENT DOCUMENTS 3,661,673 A * 5/1972 Merriam ................. B32B 37/20
156/279
4,307,003 A * 12/1981 Niswonger .............. C09G 1/10
523/400
(Continued)

FOREIGN PATENT DOCUMENTS

CN    104411900 A    3/2015
CN    111472517 A    7/2020
(Continued)

OTHER PUBLICATIONS

International Search Report and Written Opinion issued in PCT/EP2022/075317 and mailed Dec. 19, 2022.

*Primary Examiner* — Brent W Herring
(74) *Attorney, Agent, or Firm* — Heslin Rothenberg Farley & Mesiti P.C.

(57) ABSTRACT

The invention relates to a panel, such as a floor panel, a wall panel or a ceiling panel, in particular a decorative panel and to a method for producing such panel. The panel according to the present invention comprises a core layer comprising a first composite material and a second composite material which have different material characteristics. The panel is further provided with a plurality of cavities.

20 Claims, 6 Drawing Sheets

(51) Int. Cl.
*E04F 13/08* (2006.01)
*E04F 13/18* (2006.01)
*E04F 15/02* (2006.01)
*E04B 9/00* (2006.01)

(52) U.S. Cl.
CPC ........ *E04F 13/18* (2013.01); *E04F 15/02038* (2013.01); *E04F 15/105* (2013.01); *E04B 9/001* (2013.01); *E04B 9/0457* (2013.01); *E04F 13/0889* (2013.01); *E04F 2290/043* (2013.01)

(58) Field of Classification Search
CPC ..... E04F 13/18; E04F 15/105; E04F 2203/08; E04B 9/001; E04B 9/045; E04B 9/0457; E04B 9/0464
See application file for complete search history.

(56) References Cited

U.S. PATENT DOCUMENTS

| | | | | | |
|---|---|---|---|---|---|
| 6,440,538 | B1* | 8/2002 | Ungar | .................... | D21H 27/28 428/143 |
| 10,392,744 | B2* | 8/2019 | Rose | ................. | B32B 27/40 |
| 2011/0296780 | A1* | 12/2011 | Windmoller | ............ | B32B 27/20 156/182 |
| 2014/0170359 | A1* | 6/2014 | Schwitte | ................ | B32B 27/10 428/41.5 |
| 2017/0218226 | A1* | 8/2017 | Ho | ....................... | C09D 175/06 |
| 2018/0010329 | A1* | 1/2018 | Golding, Jr. | .............. | B32B 5/26 |
| 2018/0079124 | A1* | 3/2018 | Banerjee | ................ | B32B 27/34 |
| 2018/0171644 | A1* | 6/2018 | Zhang | ................... | B32B 27/065 |
| 2018/0298621 | A1* | 10/2018 | Courey | ................... | B32B 3/06 |
| 2019/0119439 | A1* | 4/2019 | Queen | .................... | C08G 63/66 |
| 2019/0145109 | A1* | 5/2019 | Esbelin | ..................... | B32B 5/24 428/213 |
| 2019/0169858 | A1* | 6/2019 | Courey | ................. | E04F 15/107 |
| 2019/0316363 | A1* | 10/2019 | Courey | ................... | B32B 5/32 |
| 2019/0360216 | A1 | 11/2019 | Hayes et al. | | |
| 2020/0095776 | A1 | 3/2020 | Kim | | |
| 2020/0139686 | A1* | 5/2020 | Rao | ........................ | E04F 15/105 |
| 2020/0290323 | A1 | 9/2020 | Hannig et al. | | |
| 2020/0308846 | A1* | 10/2020 | Josefsson | ................ | E04F 13/076 |
| 2020/0385998 | A1* | 12/2020 | Courey | ................... | B32B 3/06 |
| 2023/0125460 | A1* | 4/2023 | Baert | ....................... | B05D 3/12 428/172 |
| 2025/0122730 | A1* | 4/2025 | Boucké | ............... | E04F 13/0894 |

FOREIGN PATENT DOCUMENTS

| EP | 1911578 B1 | 4/2008 |
|---|---|---|
| KR | 200399170 Y1 | 10/2005 |
| WO | 2014007738 A1 | 1/2014 |
| WO | 2014181031 A1 | 11/2014 |

* cited by examiner

PANEL AND METHOD FOR PRODUCING A PANEL

CROSS REFERENCE TO RELATED APPLICATIONS

This application is a U.S. National Phase filing under 35 U.S.C. § 371 of International Application No. PCT/EP2022/075317, filed Sep. 12, 2022, and published as WO 2023/036989 A1 on Mar. 16, 2023. PCT/EP2022/075317 claims priority from Netherland patent application No. 2029176, filed Sep. 13, 2021. The entire contents of each of these prior applications are hereby incorporated herein by reference.

The invention relates to a panel, in particular a floor panel, a wall panel, or a ceiling panel. The invention also related to a method for producing such panel.

BACKGROUND

The market of rigid floating floors has known a significant growth over the past years, evolving from thin flexible strips of vinyl or LVT (Luxury Vinyl Tiles) to thick, rigid engineered hybrid products integrating multiple layers that feature multiple benefits such as an unprecedented stability under temperature fluctuations, reduced chance of telegraphing or deformation on uneven subfloors and increased lock strength between panels. This development towards more rigid floor panels, typically having a polymeric core is carried by products such as WPC (Wood Plastic Composite, in effect a foamed PVC core with or without wood particles, and a density of around 900 kg/m3) and SPC (Stone Plastic Composite, a solid PVC core with a density of around 2000 kg/m3). Compared to WPC, SPC has a superior dimensional stability when subjected to temperature fluctuations, allowing for a larger installation surface area, and installation in hot and high-traffic areas. Another advantage of solid core SPC compared to low density WPC is its resistance to impacts and indentations. A disadvantage inherent to solid core SPC however is that its acoustic performance is unsatisfactory. Its sound performance underperforms with respect to the more flexible and soft LVT and WPC. In general, it can be said that an increase in filler or mineral content in the product, leads to a higher rigidity and an improved dimensional stability; but also to a worse acoustic performance. Acoustical performance in the flooring industry is understood as both the amplitude reduction of a sound wave when moving through the flooring (sound transmitted to room below) as well as reduction of amplitude when tested for reflected walking sound (the sound heard in the same room). The transmission sound reduction can be tested as "Delta IIC" (USA) or "Delta Lw" (Europe, Australia). These two test methods give an indication of the sound transmission reduction to the room below due to the decorative flooring, in simple terms being the difference between sound transmission with or without the decorative flooring installed. To improve (reduce) the amplitude of the transmitted sound, an underlay can be installed between the decorative flooring and the subfloor, or an acoustic pad can be adhered to the back surface of the decorative flooring in the factory. Per illustration, a 4 mm SPC with a 1 mm pre-attached EVA backing can expect to reach a Delta Lw result of 12 dB; a WPC product with the same specifications generally reaches 20 dB. The lower density of the WPC allows for an improved sound absorption. Alas, as it contains a comparatively low ratio of mineral content, it is therefore inherently less dimensionally stable compared to the solid core SPC. There is therefore need for a flooring product that features the benefits of both an SPC panel (rigid, no telegraphing, stable, indentation resistance) and a WPC panel (lower weight and improved acoustical performance).

It is known in the prior art to apply "grooves" on the back of a wood-based or thermoplastic flooring panel to improve stability and increase flexibility. These grooves are generally applied through removal of material by cutting with a saw blade or carving with a tool. It is also known to apply grooves to extruded thermoplastic flooring panels through clever shaping of the extruding mould through which the single-piece support plate is extruded, thereby forming "strip-shaped recesses" that follow the direction of extrusion. Both production methods result in linear designs of the bottom surface texture. In effect these panels feature a linear or longitudinal design where the boundaries of the cavities applied to the bottom surface of the floor panels are one-directional on the plane of the bottom surface. Although the applied grooves may have at least one boundary that defines the exit or entry point of the tool used for their application, at least 90%, often more than 95%, most often more than 98% of the entire perimeter of these linear or longitudinal cavities or grooves have boundaries that are linear and parallel to one another. These longitudinal cavity boundaries form a line between the point of entry into the panel and their point of exit. Typically, the applied grooves are defined therefore by boundaries that are dominantly facing in a single direction, equal to the direction of the cutting or extrusion process through which they were applied. When there is a plurality of these grooves present on the back surface, they are present with the dominant linear or longitudinal boundaries parallel to one another and facing in the same direction. Such panels miss opportunities for acoustic improvement as they do not allow for more complex acoustical designs.

SUMMARY OF THE INVENTION

It is a goal of the current invention to provide a panel which at least partially has benefits of a panel with reduced weight but also provide an improved acoustic performance.

The invention provided thereto a panel, such as a floor panel, a wall panel or a ceiling panel, in particular a decorative panel, comprising:
  at least one core layer, said core layer comprising:
    at least one upper core layer comprising a first composite material; and
    at least one lower core layer comprising a second composite material;
  wherein at least part of the bottom surface of the lower core layer is provided with a plurality of impressed cavities and/or wherein the Vicat softening temperature of the upper core layer is at least 15 degrees Celsius higher than the Vicat softening temperature of the lower core layer.

BRIEF DESCRIPTION OF THE FIGURES

The invention will be elucidated in more detail with reference to the following non-limitative figures.

Figure 1A:
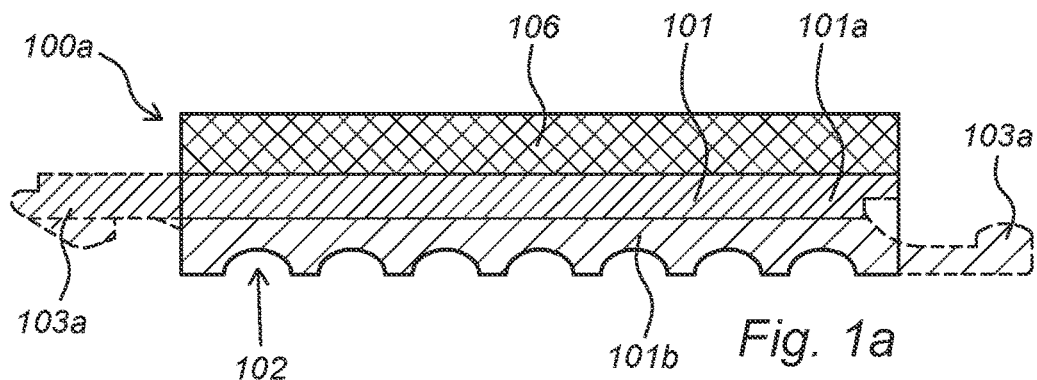
FIGS. 1a-1e illustrate a cross section of possible embodiments of a panel according to the present invention.

Within these figures, similar references correspond to similar or equivalent components and/or technical features.

DETAILED DESCRIPTION

The panel according to the present invention wherein at least part of the bottom surface of the lower core layer is provided with a plurality of impressed cavities and
wherein the Vicat softening temperature of the upper core layer is at least 15 degrees Celsius higher than the Vicat softening temperature of the lower core layer results in a panel having an improved acoustical performance and reduced weight with respect to substantially solid panels, without compromising on the rigidity or indentation resistance of the panel. At least the upper core layer of the panel is relatively rigid, which is beneficial as compared to a flexible panel, a substantially rigid panel facilitates relatively easy handling, and/or installation. Further, a substantially rigid panel is better equipped to bridge slight bumps and undulations in a subfloor without transferring them to the surface. This is in particular beneficial for use as floor panel, but rigidity of the panel may also be of benefit in case the panel is used as wall panel or ceiling panel. However, as outlined above, rigid panels typically experience an unsatisfying acoustic performance. This drawback is overcome by at least part of the bottom surface of the core layer being provided with a plurality of impressed cavities. The presence of the plurality of (impressed) cavities in the core layer causes at least a reduction of material in the lower core layer. This may affect the absorption, transmission, reflection, refraction and/or the diffraction of sounds waves interacting with the panel. It is experimentally found that the combination of a composite core layer being provided with cavities, at least in the lower core layer thereof, according to the present invention provides a positive effect on the acoustic performance of the panel, wherein a sound dampening effect is obtained. This is beneficial as it may eliminate the requirement of using an additional sound dampening layer underneath the panel, or on the top of the back surface.

With the presence of a plurality of impressed cavities in at least part of the lower core layer of a panel according to the present invention, there is reduction of material therein which results to a lightweight but durable panel. Although there is reduction of material in the lower core layer due to the plurality of cavities therein, it has been found that the dimensional stability of the lower core layer, and the core layer in whole, is not negatively affected by said reduction of material due to the presence of the upper core layer according to the present invention. With the provision of a plurality of cavities in at least part of the lower core layer, the acoustics performance of the panel is drastically improved due to excellent sound absorption in the bottom layer. The cavities positively affects the sound absorption of the panel, in particular the lower core layer, by allowing said lower core layer to able to take in sound energy when sound waves are encountered and does not reflect this energy which contributes to unwanted noise. Part of the absorbed energy is transformed into heat and part is transmitted through the plurality of cavities in the bottom layer. Furthermore, due to the softness of the envisioned lower core layer, the lower core layer acts as a sound and vibration dampening layer.

As indicated above, the presence of plurality of impressed cavities in the at least one lower core layer further aids with noise and echo elimination by absorbing sound better. The plurality of cavities are typically configured to scatter sound waves throughout different frequencies, which in essence, deflects noise by reducing the number of sound reflections and radically reducing the level of noise production that occur within the panel. It is conceivable that at least one cavity has, and preferably a plurality of cavities have, a depth that is defined by at most the thickness of the lower core layer. It is also conceivable that at least one cavity has, and preferably a plurality of cavities have, a depth that is defined by at least a distance from an outer surface of the lower core layer to at most a bottom surface of the upper core layer. With the at least one cavity having a depth by at most the thickness of the lower core layer, or at most at a bottom surface of the upper core layer, it has been found that sound waves are functionally broken and reflected in multiple directions thereby diffusing echo within the panel and improving acoustics performance thereof. Possibly, the depth of at least one cavity van vary as seen in at least one cross-sectional direction of said cavity. In addition, the presence of the plurality of cavities in the bottom layer of the panel causes at least a reduction of material in the panel. This may affect the absorption, transmission, reflection, refraction and/or the diffraction of sounds waves interacting with the panel.

A benefit of the core layer comprising at least one upper core layer comprising a first composite material and at least one lower core layer comprising a second composite material, wherein the Vicat softening temperature of the upper core layer is at least 15 degrees Celsius higher than the Vicat softening temperature of the lower core layer results in that the upper core layer is that the impressing step applied for the provision of the impressed cavities does not negatively affect the upper core layer of the core layer. Hence, the impressed cavities can be provided at the bottom surface of the lower core layer by means of pressure and/or heat without adversely affecting or deforming the upper core layer.

The core layer can also be referred to as a multilayer core layer. The core layer may comprise at least one upper core layer and at least one lower core layer which are integrally connected. Hence, the core layer may integrally comprise at least one upper core layer and at least one lower core layer. The upper core layer and the lower core layer may be interlinked. It is also conceivable that the core layer comprises multiple upper core layers and/or multiple lower core layers. In case the core layer comprises more than two layers, it is conceivable that each core layer has a different material composition and/or material properties.

A benefit of the applied material and the cavities according to the present invention is that the rigidity of the composite material may prevent undesired vibration and flexibility of the panel during use. This is also positive for the overall performance of the panel during use. Impressed cavities have to be understood as cavities mechanically pressed into the bottom surface of the core layer during production. This mechanical impressing step is preferably performed when the core layer is sufficiently soft, which is typically realized prior to subsequent (further) curing and/or (further) hardening of the core layer.

At least part of the bottom surface of the core layer, and in particular of the lower core layer, is typically substantially planar. In particular, the bottom surface generally defines a substantially planar surface. When it is referred to a cavity also the terms recess, opening, and/or depression could be used. The cavities are typically localized recessed formed in the planar back surface of the core layer during the production process, beneficially immediately after extrusion, and/or during hot pressing, and/or right before curing of the composite material(s) forming the core layer(s) of the panel. The panel is a typically a waterproof panel. Due to the good acoustic performance of the panel, the panel could also be referred to as acoustic panel.

The Vicat softening temperature is an indicator of the softening of a composite material, in particular a polymeric composite material, at elevated temperatures. Where it is said that the Vicat softening temperature of the upper core layer is at least 15 degrees Celsius higher than the Vicat softening temperature of the lower core layer, it can also be said that the Vicat softening temperature of the first composite material is at least 15 degrees Celsius higher than the Vicat softening temperature of the second composite material. Preferably, the Vicat softening temperature of the upper core layer is at least 20 degrees Celsius higher than the Vicat softening temperature of the lower core layer, more preferably at least 25 degrees Celsius. The invention in particular relates to a panel wherein there is at least 15 degrees Celsius variation between the Vicat softening temperature of the upper core layer and the lower core layer, wherein preferably the Vicat softening temperature of the lower core layer is lower than the Vicat softening temperature of the upper core layer. At the indicated deviation range, it is industrially viable to apply by the impressed cavities means of pressure and/or heat at the bottom surface of the lower core layer without adversely affecting or deforming the upper core layer.

Preferably, the lower core layer, and/or the second composite material, has a Vicat softening temperature of at least 50 degrees Celsius. The lower core layer can for example have a Vicat softening temperature in the range of 50 to 90 degrees Celsius. It has been experimentally found that this at this range, the lower core layer is able to be thermoformed into a desired shape at a temperature that can be higher than its Vicat softening temperature. As the Vicat softening temperature of the upper core layer is at least 15 degrees Celsius higher, the upper core will withstand deformation under the pressure and heat applied on the lower core layer. It is conceivable that the upper core layer and/or the first composite material has a Vicat softening temperature of at least 95 degrees Celsius.

The panel according to the present invention is possibly substantially rectangular, but may also be substantially rhombic, or substantially polygonal. In a preferred embodiment, the flexibility of the panel in the longitudinal direction is substantially equal to the flexibility of the panel in the lateral direction. For example in case of a substantially square or square-ish panel, it is also conceivable that the flexibility of the panel in a first direction is substantially equal to the flexibility in a second direction, wherein the first direction and the second direction are defined within the same plane surface and wherein the directional component of the first direction is substantially perpendicular to directional component of the second direction. With substantially equal it is meant that the average measuring deviation between the longitudinal and lateral direction is within 10%, and preferably within 5%. A benefit of such embodiment is that a relatively rigid and stable panel can be obtained. The cavities, are preferably positioned such that the flexibility of the panel is not significantly affected, in particular in at least one direction, and possibly in a single direction. It is for example conceivable that the cavities are positioned such that it does not affect the flexibility in a first direction, for example, but not limited to, the longitudinal direction.

In a further preferred embodiment, the modulus of elasticity of the lower core layer is at most 50% of the modulus of elasticity of the upper core layer. This means that the upper core layer is substantially more rigid than the lower core layer. This is beneficial for the sound attenuation and for the acoustic performance of the panel as such. The upper core layer can for example have a modulus of elasticity of at least 3500 MPa, in particular when tested according to EN310. The at least one lower core layer of the panel according to the present invention can have a modulus of elasticity that is at most 1750 MPa, preferably at most 1050 MPa, even more preferably at most 525 MPa. As such, the at least one lower core layer exhibits a substantially lower resistance to non-permanent deformation when subjected to stress as compared to the core layer. Consequently, the panel of the present invention, exhibits both rigidity brought about by the upper core layer and deformability of the at least one lower core layer. It has been experimentally found that due to this combination of the substantially rigid upper core layer and the substantially flexible lower core layer, the acoustics performance of the panel is positively affected while also maintaining dimensional stability thereof. It has been observed that this combination of a core layer having a rigid (upper) core layer and a flexible (lower) core layer enhances the sound absorption of the panel by damping the vibrations being applied thereto. In addition, it has been observed that this combination of the multilayer core layer having rigid and flexible core layers radically reduces the amplitude of vibration energy applied in the panel thereby also reducing unwanted noise.

The modulus of rigidity of the panel as such is preferably at least 2500 MPa. In a further preferred embodiment, the modulus rigidity of the panel in the longitudinal direction is at least 2500 MPa and/or the modulus rigidity of the panel in the lateral direction is at least 2500 MPa when measured according to the EN 310 standard. The bottom structure of the core layer of the panel according to the present invention has therefore a positive effect on the stability, pressure distribution and strength of the panel in both longitudinal and lateral directions. This is a marked improvement over the prior art, which panels suffer from reduced modulus of rigidity perpendicular to the direction of the recesses or grooves formed through subtractive manufacturing processes.

The upper core layer, and in particular the upper surface of the upper core layer, can have a Shore D hardness in the range of 85 to 95. The lower core layer, and in particular the upper surface of the lower core layer, can have a Shore D hardness in the range of 55 to 65. The hardness of the core layer(s) can for example be measured with a durometer. In this method a higher Shore D value corresponds to a higher hardness. The hardness is an indication of the ability of the tested material to deform locally at a point of pressure when a perpendicular force is applied to its surface. As impact noise is generated by the striking of a hard object, such as a shoe heel, a chair, a smartphone, etc, on a hard surface, it follows that the harder the surface, the higher the amplitude and pitch of the noise generated, and conversely, the softer the surface or object, the lower the amplitude and pitch of the noise generated. The combination of an upper core layer having a higher hardness than the lower core layer has a positive effect on the acoustic performance of the panel. Said range of the Shore D hardness for the upper core layer has a positive effect on the attenuation of the generated sound whereas said range of the Shore D hardness for the lower core layer has a positive effect on the diminishing of the generated sound.

The first composite material at least partially differs in composition from the second composite material. However, the first composite material and the second composite material may comprise at least some similar basic materials. Each composite material may for example comprise at least one mineral material and at least one binder. The upper core layer may comprises at least one binder, wherein the ratio of weight percentages of mineral material relative to said binder is preferably at least 1. It is also conceivable that the lower core layer comprises at least one binder, wherein the ratio of weight percentages of mineral material relative to said binder is at least 1. In a beneficial embodiment, the binder of the first composite material of the upper core layer is similar to the binder of the second composite material of the lower core layer. This embodiment is beneficial as it allows efficient thermoforming. The at least one first composite material and/or the at least one second composite may fore example comprise a thermoplastic and/or thermosetting material and preferably a mineral material.

Preferably, the mineral content of the first composite material is greater than the binder, or thermoplastic content, by at least 50%. In a preferred embodiment, the first composite material comprises at least 40 wt % of mineral material, preferably at least 50 wt % and more preferably at least 60 wt %. Said mineral content results in a relatively rigid core layer, and thus a relatively rigid panel. The presence of an upper core layer comprising at least 40 wt % of mineral material contributes to an increase of the rigidity of the panel in view of a panel having a core layer which is made of a polymeric material. Compared to a relatively flexible panel, a substantially rigid panel is better equipped to bridge slight bumps and/or undulations in a subfloor without transferring them to the surface of the panel. It is also conceivable that the second composite material comprises at most 60 wt % of mineral material, preferably at most 50 wt %, more preferably at most 30 wt %. Preferably, the mineral content of the second composite material is lower that the mineral content of the first composite material, in particular by at least 50%, preferably by at least 60%, and more preferably by at least 70%. Said ranges of the mineral content in the first and/or second composite material positively contribute to the Shore D hardness of the core layers. The mineral content of the at least one lower core layer and the difference thereof to the mineral content of the upper core layer entails flexibility in the at least one lower core layer. It is conceivable according to the present invention that the core layer comprises an increased mineral content to thermoplastic of the core of at least 3:1. It is also possible that the upper core layer comprises up to 80% by weight of mineral material. A higher mineral content typically results in a more rigid panel. Moreover, due to the relatively large quantity of mineral material and the relatively low quantity of thermoplastic material in the composite core layer, a significantly improved temperature resistance can be obtained, in particular with respect to conventional floor panel having a core which is predominantly PVC based. The panel according to the invention typically would not suffer from undesired shrinking and expansion due to seasonal and/or local temperature changes.

The core layer, and in particular the upper core layer and/or the lower core layer may also comprise at least one Vicat modifier. Non-limiting examples of Vicat modifiers which could be used are ASA (Poly acrylonitrile-styrene-acrylate), ABS, a thermoset system, an epoxy system, and the like. The addition of any of said Vicat modifiers typically increases the Vicat softening temperature of the core layer wherein said modifier is applied. The Vicat modifier may thus also be applied to increase the difference of the Vicat softening temperature between the upper core layer and the lower core layer.

The first composite material and/or the second composite material may comprise at least one mineral material selected from the group consisting of: magnesium oxide (MgO), magnesium chloride (MgC), magnesium oxy sulphate, calcium carbonate (CaCO3), chalk, clay, calcium silicate and/or talc. These materials have proven to impart a sufficient rigidity to the composite material. As a further non-limiting example, limestone (e.g. calcium carbonate with magnesium carbonate) may be used as mineral material in the upper core layer and/or the lower core layer. Possibly, the mineral material is present as particulate mineral filler.

Typically, the upper core layer and/or the lower core layer of the core layer of a panel according to the present invention is composed of a composite material comprising a mixture of mineral material and thermoplastic material. Non limiting examples of thermoplastic material are polyvinyl chloride (PVC), polyethylene (PE), polyurethane (PU), acrylonitrile butadiene styrene (ABS) and/or polypropylene (PP). It is if for example conceivable that the first composite material and/or the second composite material comprises at least one thermoplastic material selected from the group consisting of: polyvinyl chloride (PVC), polystyrene (PS), polyethylene (PE), polyurethane (PU), acrylonitrile butadiene styrene (ABS), polypropylene (PP), phenolic, melamine or formaldehyde resins or combinations thereof. The thermoplastic material may also be a vinyl containing thermoplastic material. The core layer may also comprise a mixture of aforementioned materials. Generally, the ratio of weight percentages of mineral material relative to thermoplastic material is at least 1. Preferably, the first composite material comprises at least 15% by weight of thermoplastic material. The second composite material comprises preferably at least 30% by weight of thermoplastic material. The first composite material preferably comprises a maximum of 40% by weight of thermoplastic material. The second composite material preferably comprises a maximum of 65% by weight of thermoplastic material. The composition of the first and second composite materials have impact in the rigidity of the core layer as such as well as on the temperature resistance of the individual core layers.

The core layer, and in particular the upper core layer and/or the lower core layer, may further comprise at least one additive chosen from the group consisting of: a pigment, an impact modifier, a lubricant, a stabilizer, a wax, and/or an aid processing agent. Various pigments, such as inks, to impart colour to the first and/or second composite material. If applied, pigments are commonly present in an amount of 0-5% by weight in the composite material. It is also conceivable that the first and/or second composite material comprises an organic or inorganic binder. As impact modifier, preferably MBS (Methacrylate-Butadiene-Styrene), CPVC (chlorinated PVC), ABS (acrylonitrile butadiene styrene) or TPE (thermoplastic elastomer) is used, which is more preferably present in an amount of 0-5% by weight in the composite core layer. Also, at least one lubricant may be present and more preferably an internal lubricant and an external lubricant. The optional stabilizer can be selected for effectiveness with the particular polymer used and may for example be a calcium zinc stabilizer. Preferably, the total amount of additives present in the composite core layer is restricted to 1-15% by weight, more preferably 5-15% by weight, and most preferably 8-12% by weight. The core layer is in a possible embodiment substantially free of natural organic fibres, and in particular substantially free of wood (for example wood fibres, and including wood dust, and bamboo dust).

The transition temperature of the lower core layer is preferably at least 10 degrees Celsius lower than the transition temperature of the upper core layer. Said temperature difference between the transition temperatures of the respectively upper core layer and the lower core layer basically allows the lower core layer to deform and enable the formation of a plurality of impressed cavities during production whilst ensuring that the form and/or shape of the upper core layer remains substantially intact. Preferably, the upper core layer and the lower core layer are extruded layers formed via an extrusion process. The core layer can be formed via co-extrusion of at least one upper core layer and at least one lower core layer. Hence, at least one upper core layer and at least one lower core layer can be formed via co-extrusion. Alternatively, the upper core layer and/or the lower core layer can be a calendared layer formed via a calendaring process or a cured layer formed via a curing process or a via a hot-pressing process. The upper core layer and the lower core layer can also be extruded and subsequently laminated under heat and pressure. Alternatively, the upper core layer and the lower core layer can be attached via at least one adhesive and/or glue layer. Preferably the upper core layer and the lower core layer are mutually interlinked.

It is conceivable that the core layer, and in particular the upper core layer and the lower core layer, is an extruded layer formed via an extrusion process. A benefit of a core layer being formed via an extrusion process is that the panels can be produced in a relatively cheap way. Further, an extruded core layer is found to be advantageous in regard of the rigidity obtained, as well as being capable of forming a fusion bonding with the top layer, if applied. Here, the extrusion process and the fusion process can be performed simultaneously during production of the panel. It is in particular beneficial if the cavities in the lower core layer are formed immediately after the extrusion process, before or during lamination with a decorative layer. In this manner it can be prevented that material is to be removed from the core after production of the panel. Hence, the panel can be produced in a more efficient way. Further, it is prevented that residual material is formed. It is also conceivable that the cavities are formed substantially immediately after an extrusion process or during the co-extrusion process of manufacturing the upper core layer and the lower core layer. In this context, it is meant that the cavities are formed prior to the core being solidified. It is therefore meant that the cavities are formed in the back surface of the lower core layer when the (second) composite material has a malleable consistency or viscosity, therefore not being rigid.

In another possible embodiment, it is conceivable that the core layer is formed via hot-pressing. For this technique it is possible that the cavities is formed during production and/or that the cavities is provided afterward production of the panel. Hot pressing may positively contribute to the rigidity of the panel. It is also conceivable that the core layer is formed via a curing process. It is therefore meant that the cavities are formed in the back surface of the core when the core has a malleable consistency or viscosity, therefore is not rigid. It is conceivable that the cavities are formed in the back surface of the core through an imprinting process, preferably rotary imprinting. It is also conceivable that at least one cavity is formed in the back surface through other methods such as a heating and/or pressing process, etching, milling, engraving, stamping, embossing, subtractive manufacturing, additive manufacturing, or combinations thereof.

The panel may optionally comprise at least one reinforcement layer. Non-limiting examples of such reinforcement layer are fiber glass, polypropylene, jute, cotton and/or polyethylene terephthalate. It is in particular beneficial if the reinforcement layer is at least partially impregnated with a thermosetting resin. Such thermosetting resin may be selected from the group comprising of: melamine formaldehyde resin, phenolic resins and/or urea formaldehyde. Typically, a reinforcement layer, if applied, is present near the top surface and/or near the bottom surface of the panel. Preferably, the reinforcement layer is attached to core layer, if applied.

Preferably, the density of the lower core layer is lower than the density of the upper core layer. Preferably, the density of the upper core layer is at least 1900 kg/m3. It is conceivable that the upper core layer and/or the lower core layer has a density in the range of 1900 to 2100 kg/m3. However, it is also conceivable that the lower core layer has a density lower than 1900 kg/m3. The density of the lower core layer can for example be in the range of 900 to 1700 kg/m3. The core layer may also have a density gradient over the core layer.

An embodiment of the panel according to the present invention is conceivable wherein the lower core layer is at least partially foamed. Yet in a further possible embodiment, the upper core layer and the lower core layer are at least partially foamed. The upper core layer and/or lower core layer can for example be a closed cell foam and/or an open cell foam.

It is conceivable that the boundaries of the impressed cavities are multidirectional on the plane of the bottom surface of the lower core layer. The panel according to the present invention hence may benefits from the presence of cavities wherein the boundaries of the cavities are multidirectional on the plane of the bottom surface of the core layer. In general, flooring can be subjected to a wide range of sound waves, such as footfall noise, television or radio sounds, talking sounds, the sound of a crying baby, the noise produced by falling objects etc. As sound waves are vibrations that travel easily in a solid direct pathway, flooring panels that lack any geometry on the bottom surface have a very narrow band of sound wavelength attenuation. To improve sound attenuation, it is possible to either stop or absorb, or direct the vibration into another direction, dissipating the sound wave. The presence of cavities in the back of the plank create extra surfaces for the shockwave to transfer through. Panels featuring grooves on the bottom surface are expected to perform slightly better than panels without any geometry, but still only attenuate a very limited band of wavelengths, as they are only able to dissipate the sound in one direction. The panel of the current invention improves greatly upon this by providing a flooring panel of a multilayer core layer which is able to attenuate sound waves due to the presence of impressed cavities in the lower core layer that dissipate sound waves in multiple directions, greatly increasing the acoustically absorptive surface area. To this end, when the cavities feature boundaries that are multidirectional, they greatly improve upon the state of the art which only features one-directional dissipation.

The panel according to the present invention may comprise, and benefit, from cavities with sizes specifically designed to attenuate sound waves at a certain frequency. It is possible to apply a plurality of cavities with different sizes specifically designed as to increase the band of attenuated wavelengths. Further, impressed cavities typically have clear boundaries. Due to the cavities having clear boundaries, the cavities also function as attenuation chambers. This greatly improves upon the state of the art, which strip-shaped recesses or grooves cannot optimally reduce frequencies. The cavities according to the invention can be "tuned" by forming them with suitable length, width and depth dimensions to provide passive sound wave cancellation through resonance. The cavities may therefore be present in a combination of different shapes, lengths, widths and depths, thereby being present in a combination of different sizes, to provide an optimal sound wave cancellation. Preferably at least one of the dimensions of the cavities is approximately ⅕ to ⅓, more preferably around ¼th the wavelength of the target frequencies to be attenuated, thereby forming resonant chambers that are, according to empirical tests, able to optimally absorb the target frequencies. The target dimensions of the cavities can then be calculated by the formula "wavelength=speed of sound/frequency". Target frequencies are those that pose the largest range of noise in residential use, especially high-pitched noises transmitted to the room below when walked upon the flooring surface, ranging from 1,000-25,000 Hz, more preferably 4,000-20,000 Hz, most preferably 8,000-16,000 Hz. For example, at least a number of cavities can be configured to attenuate sound, preferably sound with a frequency of ranging from 20-25,000 Hz, preferably 2,000-20,000 Hz, more preferably 8,000-16,000 Hz. It is also conceivable that at least a number of cavities is configured to attenuate sound with a frequency ranging from 500 to 10,000 Hz. The maximum length and/or maximum width of at least a number of cavities could range from 2 to 15 mm, most preferably 5 mm to 10 mm. Based on aforementioned formula, the optional dimension for cavities to attenuate flooring noise in dwellings meant for residential and commercial purposes are therefore found to range from 2-15 mm, most preferably 5 mm to 10 mm width and/or length in the plane of the back surface. Optimal volumes to attenuate flooring noise in dwellings meant for residential and commercial purposes are empirically found to range from 5 cubic millimeter to 2 cubic centimeter, more preferably from 0.1 cubic centimeter to 0.6 cubic centimeter. This would typically result in on average at least a 4 dB reduction in sound amplitude compared to one-directional and 5 dB reduction compared to solid core flooring panels. It is conceivable that at least part of the cavities have differing volumes to attenuate different target frequencies.

At least one cavity may have, and preferably a plurality of cavities may have, a maximum width W and a maximum length L, wherein the ratio between the maximum width W and the maximum length L is between 0.2 and 1, preferably between 0.5 and 1. Possibly, the depth of at least one cavity varies as seen in at least one cross-sectional direction of said cavity. It is further conceivable that the depth of at least a number of cavities is situated in between 10 and 30% of the maximum thickness of the core layer. It is also possible that the depth of at least a number of cavities is situated in between 10 and 30% of the maximum thickness of the lower core layer.

The panel according to the present invention may for example be a substantially longitudinal panel. This is in particular beneficial in case the panel is used as floor panel. However, it is also conceivable that the panel is substantially rectangular, rhombic, or polygonal. The panel could be a rectangular panel defining a first longitudinal direction, wherein at least of number of cavities has an elongated shape defining a second longitudinal direction, wherein the first longitudinal direction and the second longitudinal direction mutually enclose an angle, preferably an angle falling within the range of 30 to 90 degrees.

The plurality of impressed cavities may be present in a predetermined pattern. The cavities may for example extend from a first distal end of the panel to a second distal end of the panel. In such embodiment, said first distal end typically opposes said second distal end. It is also conceivable that the cavities are positioned at a predetermined distance from an edge of the panel. It is for example conceivable that the cavities do not extend through an (outer) edge of the panel. Hence, the cavities may be substantially centrally positioned. It is found this is beneficial for the sound absorbing properties of the panel. Such embodiment additionally ensures that the stability and flexibility of the panel are not negatively affected by the cavities as there is a pull-back strength provided by the bottommost surface thus formed. A non-limiting example of a predetermined pattern is for example a zig-zag pattern. It is also conceivable that the plurality of impressed cavities comprises a repeated cavity pattern. It is further conceivable that at least part of the cavities define a cell pattern and/or a grid pattern.

In a preferred embodiment of the panel, at least part of the bottom surface of the core layer is provided with a plurality of impressed cavities. It is for example possible that the cavities are provided such that the (predetermined) pattern of cavities influences the acoustic properties, and in particular the sound dampening properties, of the panel. For such embodiment, typically the cavities extend in at least two direction within the same (horizontal plane). This may for example be the x- and z-direction, considering the cavity extends from the bottom surface towards the top surface of the core layer in the y-direction. The cavities may for example extend in at least two direction within a plane defined by the bottom surface of the lower core layer. Possibly, the cavities may extend in a direction other than the longitudinal direction of the panel in case the panel is substantially longitudinal. It is for example conceivable that the cavities extend in a combination of longitudinal and lateral directions. It is also conceivable that some or all cavities are substantially centrally positioned in the panel and/or do not extend to the (outer) edges of the panel. It is further conceivable that the cavities are positioned at a predetermined distance from another. It is also possible that the cavities form a network of interconnected cavities. This embodiment may in particular be beneficial as sound waves may travel through such interconnected cavities that sound travels through. The sound wave may lose its energy through friction between the air particles and the walls of the cavities where it is passing through.

Preferably the upper core layer is substantially solid. The upper core layer may be free of cavities. However, it is also conceivable that at least part of the cavities provided in the bottom surface of the lower core layer extend into part of the upper core layer. The upper region of the upper core layer is preferably substantially solid. It is beneficial if the cavities have a depth which is at least 20% of the total thickness of the core layer. With the depth of the cavity a distance measure in the same spatial orientation as the thickness of the core layer is considered. In general, in an assembled condition wherein panels are forming a floor covering, both the thickness of a panel and the dept of a cavity can be determined in a vertical orientation. It is also possible that the cavities have a depth which is at least 30% of the total thickness of the core layer and/or the panel. Preferably, the depth of the cavities is not larger than 55% of the total thickness of the core layer. The latter may prevent that deflection of the core layer occurs when load is applied on top of the panel.

It is conceivable that adjacent cavities are separated by at least one separating wall, making integral part of the core layer, wherein preferably the thickness of the separating wall is less than 50%, preferably less than 20% of the maximum width W of each of the adjacent cavities. Said at least one separating wall could be multidirectional on a plane defined by the bottom surface of the lower core layer. The bottom surface of the lower core layer can be composed of an impressed portion formed by said plurality of impressed cavities and a remaining unimpressed portion, wherein the footprint of the impressed portion covers at least 50%, preferably at least 70% of the surface area of the bottom surface of the lower core layer.

The thickness of the upper core layer may substantially equal the thickness of the lower core layer. However, it is also conceivable that the upper core layer has thickness that is larger than the thickness of the lower core layer, or vice versa. In a possible embodiment, the upper core layer is thicker than the lower core layer, in particular the thickness of the upper core layer is larger by at least 50%, more preferably by at least 100%, even more preferably by at least 150% than the thickness of the lower core layer. The upper core layer may for example have a thickness of at least 3 mm. It is for example possible that the thickness of the upper core layer is between 3 and 9 mm, preferably between 4 mm and 5.5 mm or between 5.5 mm and 7 mm. The lower core layer may for example have a thickness of at least 0.1 mm. It is for example possible that the thickness of the bottom layer is between 0.1 and 2.5 mm. It is also possible that the thickness of the lower core layer is between 0.5 and 5 mm, in particular between 2.5 and 4 mm. In yet another embodiment, the lower core layer can be thicker than the upper core layer, in particular the thickness of the lower core layer is larger by at least 30%, more preferably by at least 50%, even more preferably by at least 90% than the thickness of the upper core layer. The lower core layer may for example have a thickness of at least 4 mm. It is for example possible that the thickness of the lower core layer is between about 4 to 7 mm. The upper core layer may for example have a thickness of at least 1.5 mm. It is for example possible that the thickness of the upper core layer is between 1.5 and 4 mm, preferably between 2 mm and 3.5 mm or between 2.5 mm and 3.5 mm. Due to the combination of rigidity and sound absorbing performance of the panel according to the present invention, a relatively thin panel could be applied. Possibly, the thickness of the panel is smaller than 3.5 cm, more preferably smaller than 2.75 cm. It is for example possible that the thickness of the panel is between 0.5 and 3 cm, preferably between 0.7 and 2.5 cm. Such thickness is substantially smaller than the thickness of a conventional acoustic (wall, floor or ceiling) panel In a further preferred embodiment, the planar surface area of the bottom surface of the core layer, is at least 30% less than the planar surface area of the top surface of the core layer. It is experimentally found that this difference further contributes to the acoustic performance of the panel whilst not affecting the rigidity and/or stability of the panel. The top surface of the upper core layer is typically substantially even and free of cavities.

It is possible that the cavities have a substantially curvilinear geometric cross section. This may be a cross section of the panel seen from a perpendicular direction with respect to a plane defined by the bottom surface of the lower core layer. This may further contribute to the desired absorption, transmission, reflection, refraction and/or the diffraction of sounds waves interacting with the panel. It is also possible that the cavities have a substantially curvilinear geometric shape within a plane defined by the bottom surface of the lower core layer. Such shape may also contribute to the sound distribution within the material. It is further conceivable that part of the lower core layer which encloses a cavity has a structured surface. It is for example possible that the surface of the lower core layer enclosing the cavity is at least partially structured. This may also be a profiled or rough surface. Hence, the lower core layer may be partially provided with a profiled surfaced, preferably near or at the area defining a cavity. It is further conceivable that at least part of the impressed cavities is substantially cylindrical, pyramidical and/or conical. At least part of a cavity may for example be formed by a substantially half cylinder, in particular in a plane of the bottom surface. The depth of the cavities may vary over the length and/or width of the cavity. In particular, the shape of the cavities is to be chosen such that they provide enhanced dissipation of impact and/or airborne sound. Preferably, the geometric shape of at least one, and preferably all cavities, in the bottom surface of the lower core layer do not induce a difference in length- or crosswise flexibility of the floor panel. Hence, the geometric shape of the cavities is chosen such that it they do not negatively influence the rigidity of the panel. Preferred shapes of impressed cavities include at least one shape chosen from the group of polygons, curvilinear shapes and/or combinations thereof. This includes honeycomb, herringbone, waffle, wave-like patterns, crisscross patterns, grids, radial patterns, quilt-like patterns, or repetitive patterns of polygons (triangular, quadrilateral, pentagon, hexagon, heptagon, octagon, nonagon, or N-gons where N>10), quadrilaterals (square, rectangular, trapezoids, rhombus, parallelogram, diamond, etc.), ellipsis, trefoil, quatrefoil, circles, semi-circles, curves, or combinations thereof in side-by-side patterns, circumscribed, inscribed, randomized patterns comprised of the aforementioned shapes and patterns. Other preferred designs of the impressed cavities include triangular wedges, egg tray-shaped designs, alternating horizontal and vertical ridges, parametric acoustic surfaces, offset pyramids or pyramids with polygon base (triangular, quadrilateral, pentagon, hexagon, heptagon, octagon, nonagon, or N-gon where N>10), radial designs, or series of wells or troughs with different depths.

The core layer of the panel according to the present invention may comprise at least one pair of opposing (side) edges, said pair of opposing (side) edges comprising complementary coupling parts configured for mutual coupling of adjacent panels. The coupling parts may form part of the core layer. Hence, it is conceivable that the upper core layer and/or the lower core layer both are provided with part of said coupling parts. The coupling parts of the panel may for example be interlocking coupling parts, which are preferably configured for providing both horizontal and vertical locking. Interlocking coupling parts are coupling parts that require elastic deformation, a click or a movement in multiple directions to couple or decouple the parts with or from each other. Any suitable interlocking coupling parts as known in the art could be applied. A non-limiting example is an embodiment wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip. It is conceivable the complementary coupling parts require a downward scissoring motion when engaging, or are locked together by means of a horizontal movement. It is further conceivable that the interconnecting coupling parts comprise a tongue and a groove wherein the tongue is provided on one side edge of one pair of opposing side edges, and the groove is provided on the other side edge, or an adjacent side relative to that of the tongue, of the same pair of opposing side edges. Such a design of a coupling mechanism is well-known in the art and has proven highly suitable for panels for floor coverings such as a floating floor. In a further embodiment it is possible that the interconnecting coupling parts have an interlocking feature which prevents interconnected panels from any free movement (play). Such an interlocking feature may be a projection and a respective recess provided on the respective opposing side edges by which neighboring panels interlock with each other. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer. It is also conceivable that a strengthening coat layer of micro or nanotechnology is added on the surface of the interlocking coupling parts. The panel according to the present invention and/or the panel obtained via the method according to the present invention is suitable for use in flooring, wall or ceiling coverings preferably featuring a locking mechanism. As such a 'floating' covering can be assembled by interconnecting the individual panels with each other at all four sides, without the need for adhesives.

It is conceivable that the panel comprises at least one backing layer preferably attached to the bottom surface of the lower core layer. The backing layer may provide a protective function for the core layer, in particular the lower core layer, and thus for the panel as such. The backing layer may for example comprise an adhesive layer. This may then enable glue down installation of the panel according to the present invention. It is also conceivable that the backing layer is a balancing layer, preferably configured for stabilization and/or protection of the panel. A balancing layer may for example prevent cupping, warping and/or bowing of the panel. The balancing layer could also be referred to as stabilizing layer. It is also conceivable that at least one balancing layer is attached to top surface of the core layer. Possibly, the panel comprises a first balancing layer attached to the top surface of the core layer and a second balancing layer attached to the bottom surface of the core layer. The balancing layer may comprise lignocellulose and a cured resin. It is possible that the backing layer is substantially free of cavities. In such embodiment, the bottom surface of the core layer is provided with the cavities and the backing layer substantially fully covers said bottom surface of said core layer. The backing layer may thereby substantially seal the impressed cavities. However, it is also conceivable that the cavities extends from the backing layer into the core layer. Hence, the shape of the cavities of the backing layer may follow, or substantially equal, the shape of the cavities of the bottom surface of the core layer. In either way, the presence of a backing layer may further contribute to the acoustic performance of the panel as the backing layer may have sound dampening properties and/or to the ease of installation of the panel. Further, the backing layer may form a moist barrier. The backing layer is typically made of a polymer material, for example but not limited to polyurethane. It is also conceivable that the panel comprises a combination of any of the mentioned examples of possible backing layers. Further, the backing layer may also be a sound absorbing layer. Such sound absorbing backing layer may further contribute to the good acoustic properties of the panel. Such backing layer may also be referred to as acoustic layer. The backing layer may be composed of a foamed layer, preferably a low density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET. The backing layer, if applied, preferably has a density between 65 kg/m3 and 300 kg/m3, most preferably between 80 kg/m3 and 150 kg/m3.

In a further preferred embodiment, the impressed cavities may be at least partially filled with a filler material such as sound absorbing material and/or soundproofing material. This may further contribute to the sound absorbing character of the panel, and thus to the acoustic properties thereof. The sound absorbing material may for example be a natural material, such as bamboo, coco fibers and/or cork. Further non-limiting examples of sound absorbing material which could be used for the present invention are mineral wool, fiberglass, RPET felt, EVA, PE foam, PP foam, and/or polystyrene foam. In a further possible embodiment, the cavities may be substantially completely filled with sound absorbing material. In a further possible embodiment, the sound absorbing material may cover at least part of the back surface of the panel, forming a further sound attenuating barrier. It is conceivable that this sound absorbing material includes vibrating bodies and/or barriers of different densities. It is conceivable that this attenuating barrier features a spatially varied density able to absorb different wavelengths. It is possible that this sound absorbing material forms an interlocking structure with the cavities present in the bottom surface of the panel, thereby forming a structure inverse to the impressed cavities present in the bottom surface of lower core layer.

The panel according to the invention may further comprise at least one top layer, preferably a decorative top layer. Such decorative top layer may for example be a high pressure laminate (HPL), a plurality of impregnated layers containing lignocellulose, a wood veneer, a thermoplastic layer containing at least a decorative layer and optionally a protective top layer, a stone veneer or the like, and/or a combination of said decorative layers. The decorative top layer may possibly also comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that can be considered according to the invention include ceramic tiles or porcelain, a real stone veneer, a rubber veneer, a decorative plastic or vinyl, linoleum, and decorative thermoplastic film or foil which may be laminated with a wear layer and optionally a coating. Examples of thermoplastics may be PP, PET, PVC and the like. It is also possible to provide on the top facing surface of the upper core layer an optional primer and print the desired visual effect in a direct printing process. The decorative layer can receive a further finishing with a thermosetting varnish or lacquer such as polyurethane, PUR, or a melamine based resin. It is also conceivable that the panel comprises a top layer consisting of a ceramic tile. Such ceramic tile may for example be attached to the top surface of the core layer by means of an adhesive, such as but not limited to polyurethane. It is also conceivable that the top layer is made of a ceramic and/or stone material. Hence, the invention also relates to a panel, in particular a floor panel, a wall panel, or a ceiling panel, comprising at least one core layer, said core layer comprising at least one upper core layer comprising a first composite material and at least one lower core layer comprising a second composite material, wherein at least part of the bottom surface of the lower core layer is provided with a plurality of impressed cavities, and wherein the Vicat softening temperature of the upper core layer is at least 15 degrees Celsius higher than the Vicat softening temperature of the lower core layer and wherein the panel comprises at least one top layer attached to the top surface of the core layer, the top layer comprising a stone and/or ceramic material. Preferably, the top layer is a stone and/or ceramic tile. Alternatively, an embodiment of a panel falling within the scope of protection of this invention is an embodiment wherein the cavities are not impressed cavities but cavities which are formed by material removal. It is also conceivable that the cavities are thermoformed cavitied. Yet another alternative, the lower core layer is free of impressed cavities. Alternatively, the Vicat softening temperature of the first composite material differs at least 15 degrees Celsius from the Vicat softening temperature of the second composite material.

The invention also relates to a method for producing a panel, in particular a floor panel, a wall panel, or a ceiling panel, preferably according to any of the embodiments according to the present invention, comprising the steps of providing a first composite material, preferably a substantially malleable first composite material, providing a second composite material, wherein the Vicat softening temperature of the first composite material is at least 15 degrees Celsius higher than the Vicat softening temperature of the second composite material, preferably a substantially malleable second composite material, forming a core layer comprising an upper core layer comprising said first composite material and a lower core layer comprising said second composite material, wherein said core layer comprises a top surface and a bottom surface, impressing a plurality of cavities in at least part of the bottom surface of the core layer, in particular of the lower core layer and enabling hardening and/or curing of the core layer.

The method steps can be subsequent step. It is also conceivable that part of the method steps are performed substantially simultaneously. The first and/or second composite material can be any of the described materials for the corresponding panel according to the present invention. The second composite material can have a Vicat softening temperature in the range of 50 to 90 degrees Celsius. The transition temperature of the second composite material can be at least 10 degrees Celsius lower than the transition temperature of first composite material. Forming of the core layer(s) may for example be done via extrusion. It is conceivable that at least part of cavities is obtained via rotary imprinting and/or rotary (die) cutting. It is also conceivable that the step of providing cavities is performed by guiding the core layer, or at least the lower core layer, trough at least two rollers, wherein at least one of the rollers is provided with a surface structure configured to provide a plurality of cavities in at least part of the bottom surface of the core layer, in particular the lower core layer. Alternatively, it is conceivable that a plurality of cavities is provided by mechanical means such as drilling, punching and the like. It is conceivable that a plurality of cavities can be provided by subjecting at least part of the lower core layer to a (rotary) imprinting process. This can be done substantially directly after extrusion of the upper core layer and the bottom core layer, or after directly laminating the lower core layer on a bottom surface of the (extruded) upper core layer. The shapes and/or dimensions cavities can be any of the cavities mentioned for the panel according to the present invention. The method may further comprise the step of providing and attaching at least one backing layer to the bottom surface of the core layer and/or providing and attaching at least one top layer to the top surface of the core layer. The method may also comprise the step of machining of at least two edges of the panel which that complementary coupling parts are provided.

The invention will now be elucidated into more detail with reference to the following non-limitative clauses.

1. Panel, such as a floor panel, a wall panel or a ceiling panel, in particular a decorative panel, comprising:
   at least one core layer, said core layer comprising:
      at least one upper core layer comprising a first composite material; and
      at least one lower core layer comprising a second composite material; preferably wherein at least part of the bottom surface of the lower core layer is provided with a plurality of impressed cavities, and/or
   wherein the Vicat softening temperature of the upper core layer is at least 15 degrees Celsius higher than the Vicat softening temperature of the lower core layer.

2. Panel according to clause 1, wherein the lower core layer has a Vicat softening temperature in the range of 50 to 90 degrees Celsius.

3. Panel according to any of the previous clauses, wherein the modulus of elasticity of the lower core layer is at most 50% of the modulus of elasticity of the upper core layer.

4. Panel according to any of the previous clauses, wherein the upper core layer has a modulus of elasticity of at least 3500 MPa.

5. Panel according to any of the previous clauses, wherein the upper core layer has a Shore D hardness in the range of 85 to 95.

6. Panel according to any of the previous clauses, wherein the lower core layer has a Shore D hardness in the range of 55 to 65.

7. Panel according to any of the previous clauses, wherein the first composite material comprises at least 40 wt % of a mineral material, preferably at least 50 wt %, more preferably at least 60 wt %.

8. Panel according to any of the previous clauses, wherein the second composite material comprises at most 60 wt % of a mineral material, preferably at most 50 wt %, more preferably at most 30 wt %.

9. Panel according to any of the previous clauses, wherein the first composite material and/or the second composite material comprises at least one mineral material selected from the group consisting of: magnesium oxide, magnesium chloride, magnesium oxy sulphate, calcium carbonate, chalk, clay, calcium silicate and/or talc.

10. Panel according to any of the previous clauses, wherein the first composite material and/or the second composite material comprises at least one thermoplastic material selected from the group consisting of: polyvinyl chloride, polystyrene, polyethylene, polyurethane, acrylonitrile butadiene styrene, polypropylene, phenolic, melamine or formaldehyde resins or combinations thereof.

11. Panel according to any of the previous clauses, wherein the core layer comprises at least one binder, and preferably wherein the ratio of weight percentages of mineral material relative to said binder is at least 1.

12. Panel according to any of the previous clauses, wherein the transition temperature of the lower core layer is at least 10 degrees Celsius lower than the transition temperature of the upper core layer.

13. Panel according to any of the previous clauses, wherein the upper core layer and the lower core layer are formed via co-extrusion.

14. Panel according to any of the previous clauses, wherein the cavities are formed during an extrusion process, or substantially immediately after an extrusion process, or through hot-pressing, or through a curing process.

15. Panel according to any of the previous clauses, wherein the plurality of impressed cavities define a repeated cavity pattern.

16. Panel according to any of the previous clauses, wherein the shapes, in particular the cross-sectional shapes, of a number of cavities are chosen from the group of polygons, curvilinear shapes and/or combinations thereof.

17. Panel according to any of the previous clauses, wherein a number of cavities is substantially prism shaped comprising a prism base chosen from the group consisting of: a curvilinear prism base, a circular prism base, an n-sided polygonal prism base, wherein n≥3.

18. Panel according to any of the previous clauses, wherein the depth of at least a number of cavities is situated in between 10 and 30% of the maximum thickness of the core layer.

19. Panel according to any of the previous clauses, wherein the core layer comprises at least one pair of opposing edges, said pair of opposing side edges comprising complementary coupling parts configured for mutual coupling of adjacent panels.

20. Panel according to any of the previous clauses, comprising at least one backing layer, wherein the backing layer, preferably forming a sound attenuating barrier, covers at least part of the bottom surface of the lower core layer.

21. Panel according to any of the previous clauses, wherein the density of the lower core layer is lower than the density of the upper core layer.

22. Panel according to any of the previous clauses, wherein the lower core layer is at least partially foamed.

23. Panel according to any of the previous clauses, comprising at least one top layer, preferably a decorative top layer, either directly or indirectly, affixed to the core layer.

24. Method for producing a panel, in particular a floor panel, a wall panel, or a ceiling panel, preferably according to any of the previous clauses, comprising the steps of:
 providing a first composite material, (preferably a substantially malleable first composite material);
 providing a second composite material, preferably wherein the Vicat softening temperature of the first composite material is at least 15 degrees Celsius higher than the Vicat softening temperature of the second composite material (preferably a substantially malleable second composite material);
 forming a core layer comprising an upper core layer comprising said first composite material and a lower core layer comprising said second composite material, wherein said core layer comprises a top surface and a bottom surface,
 preferably impressing a plurality of cavities in at least part of the bottom surface of the core layer, (in particular of the lower core layer) and;
 enabling hardening and/or curing of the core layer.

25. Method according to clause 24, wherein the core layer is formed via co-extrusion.

26. Method according to clause 24 or 25, wherein at least part of cavities is obtained via imprinting, rotary imprinting and/or rotary (die) cutting.

27. Method according to any of clauses 24-26, wherein impressing of the core layer is performed by guiding the core layer trough at least two rollers, wherein at least one of the rollers is provided with a surface structure configured to provide a plurality of cavities in at least part of the bottom surface of the core layer.

28. Method according to any of clauses 24-27, wherein the second composite material has a Vicat softening temperature in the range of 50 to 90 degrees Celsius.

29. Method according to any of clauses 24-28, wherein the transition temperature of the second composite material is at least 10 degrees Celsius lower than the transition temperature of first composite material.

FIG. 1a-1e show shows schematic representations of possible embodiments of panels 100 according to the present invention. The figures show a schematic representation of a side view of the panel 100. Each panel 100a, 100b, 100c, 100d, 100e can for example be a floor panel 100, a wall panel 100, or a ceiling panel 100. Each panel comprises a core layer 101, which core layer 101 comprises an upper core layer 101a and a lower core layer 101b. The upper core layer 101a comprises a first composite material whereas the lower core layer 101b comprises a second composite material. The Vicat softening temperature of the upper core layer 101a differs from the Vicat softening temperature of the lower core layer 101b. Part of the bottom surface of the core layer 101, in particular the lower core layer 101b, of each panel 100a, 100b, 100c, 100d, 100e is provided with a plurality of impressed cavities 102 which extend towards the top surface of the core layer 101. FIG. 1a shows that the panel 100 can optionally be provided with interconnecting coupling parts 103a, 103b. Interconnecting coupling parts 103a, 103b could be applied to any of the embodiments covered by the present invention.

Figure 1B:
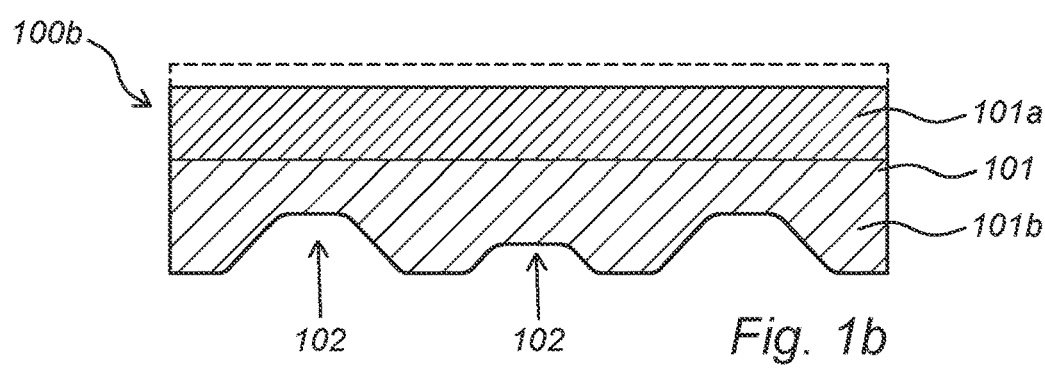
Figure 1C:
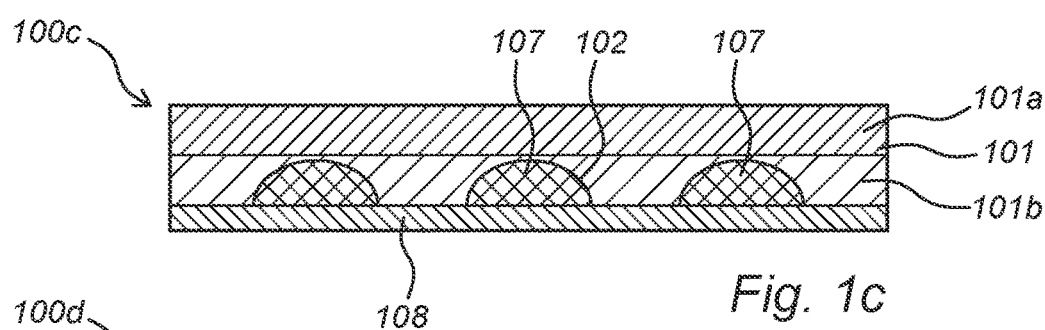
Figure 1D:
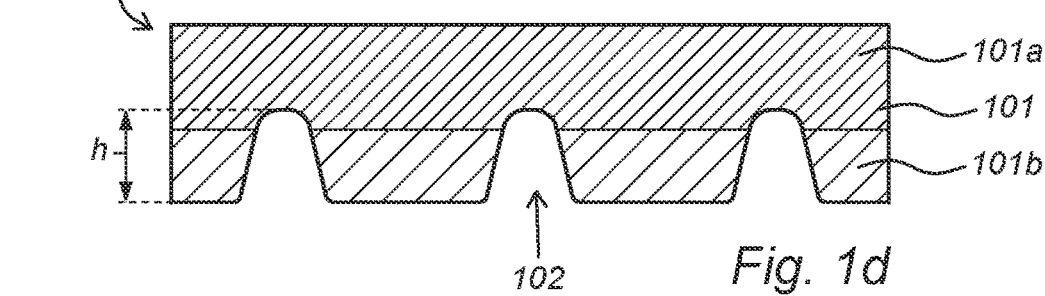
Figure 1E:
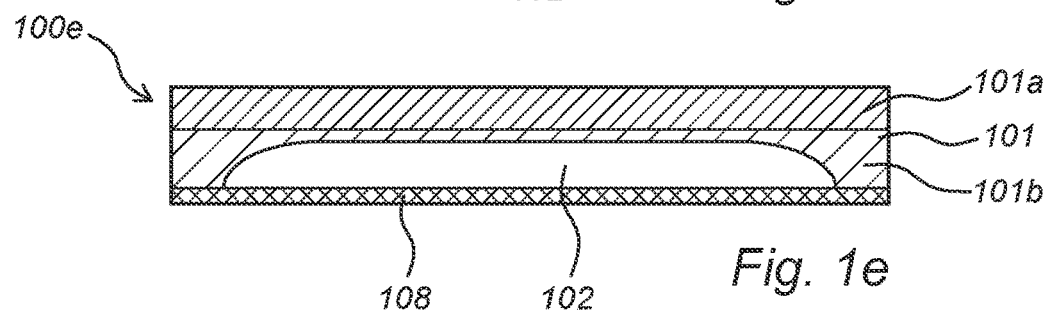

FIG. 1a shows a panel 100a comprising a plurality of cavities 102 which are positioned at predetermined distance from another. The panel 100a further comprises a top layer 106. In the shown embodiment the top layer 106 is a ceramic panel 106 attached to the top surface of the core layer 101. The coupling parts 103a, 103b extend through both the upper core layer 101a and the lower core layer 101b. FIG. 1b shows a panel 100b wherein the depth the cavities 102 differs per cavity 102. The cavities 102 are substantially trapezium shaped in cross section. Optionally, the panel 100b may comprise a decorative top layer. FIG. 1c shows an embodiment wherein the cavities 102 have a cross section which is semicircular. The cavities 102 are filled with sound absorbing material 107. The panel 100c further comprises a backing layer 108 which is attached to the bottom surface of the lower core layer 101b. FIG. 1d shows that the height, or depth, h of the cavities 102 is higher than the thickness of the lower core layer 101b. Hence the cavities 102 extend into the upper core layer 101a. FIG. 1e shows a side view of a panel 100e wherein it can be seen that the cavity 102 extends over substantially the entire length of the panel 100e but that the cavity 102 starts and ends at a predetermined distance from the outer ends of the panel 100e. The panel 100e further comprises a backing layer 108, in particular a balancing layer 108. the cavity 102 is free of filling material, such as a sound absorbing material.

FIGS. 2a-2d shows schematic representations of possible embodiments of panels 200 according to the present invention. The figures show a bottom view of the panel 200. Each panel 200a, 200b, 200c, 200d can for example be a floor panel 200, a wall panel 200, or a ceiling panel 200. Each panel 200 comprises a core layer 201 which core layer 201 comprises an upper core layer and a lower core layer. The figures show the bottom surface of the lower core layer. Part of the bottom surface of the core layer 201 of each panel 200a, 200b, 200c, 200d is provided with the (impressed) cavities 202 which extend towards the top surface of the core layer 201. In the shown embodiments, the panels 200a, 200b, 200c, 200d are not provided with (interlocking) coupling means. However, it is conceivable that said coupling means are applied.

Figure 2A:
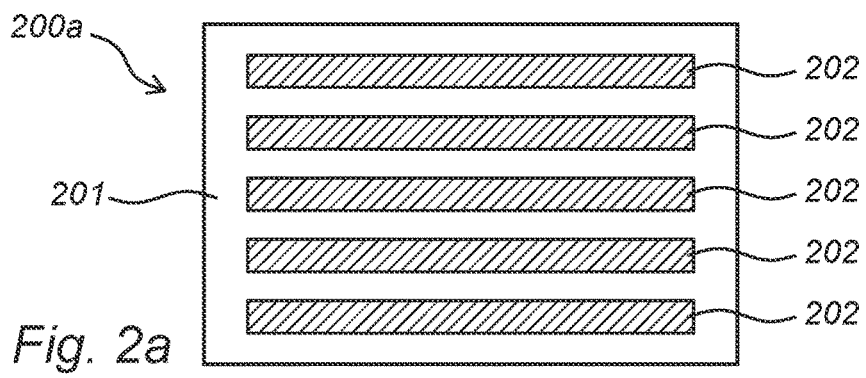
FIGS. 2a-2d illustrate a bottom view of possible embodiments of a panel according to the present invention.
Figure 2B:
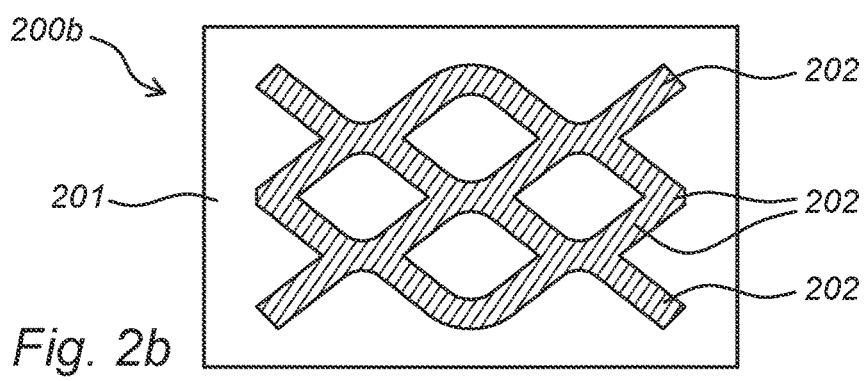
Figure 2C:
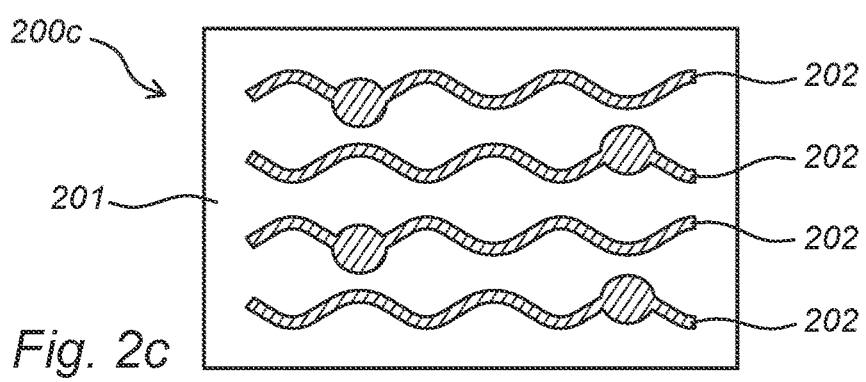
Figure 2D:
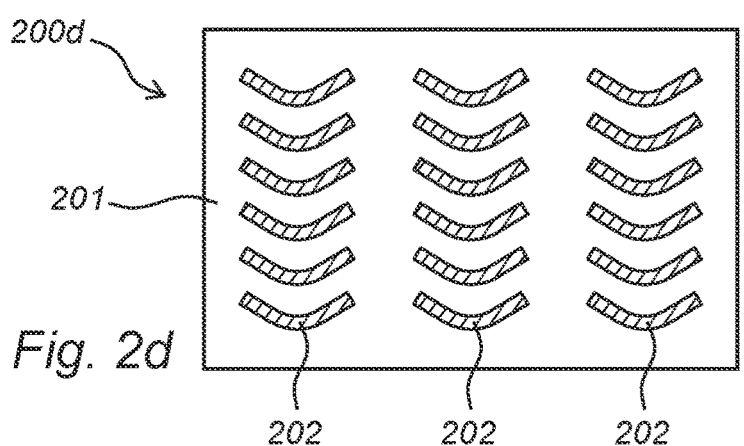

FIG. 2a shows a panel 200a comprises a plurality of substantially parallel cavities 202. Each cavity 202 is positioned at a predetermined distance from the peripheral edges of the panel 200a. It can also be seen that each cavity 202 extends in longitudinal direction of the panel 200a. FIG. 2b shows a panel 200b wherein the cavities 202 form a network of interconnected cavities 202. It is experimentally found that such embodiment may strengthen the sound dampening effect of the panel 200b. FIG. 2c shows a panel 200c with a plurality of individual cavities 202 which extend substantially in the longitudinal direction of the panel 200c. The cavities 202 are locally widened. At least the locally widened areas may for example be filled with sound absorbing material. FIG. 2d shows a panel 200d having series of substantially V-shaped cavities 202. the cavities 202 are positioned at a predetermined distance from another and do not interfere with an adjacent cavity 202.

Figure 3A:
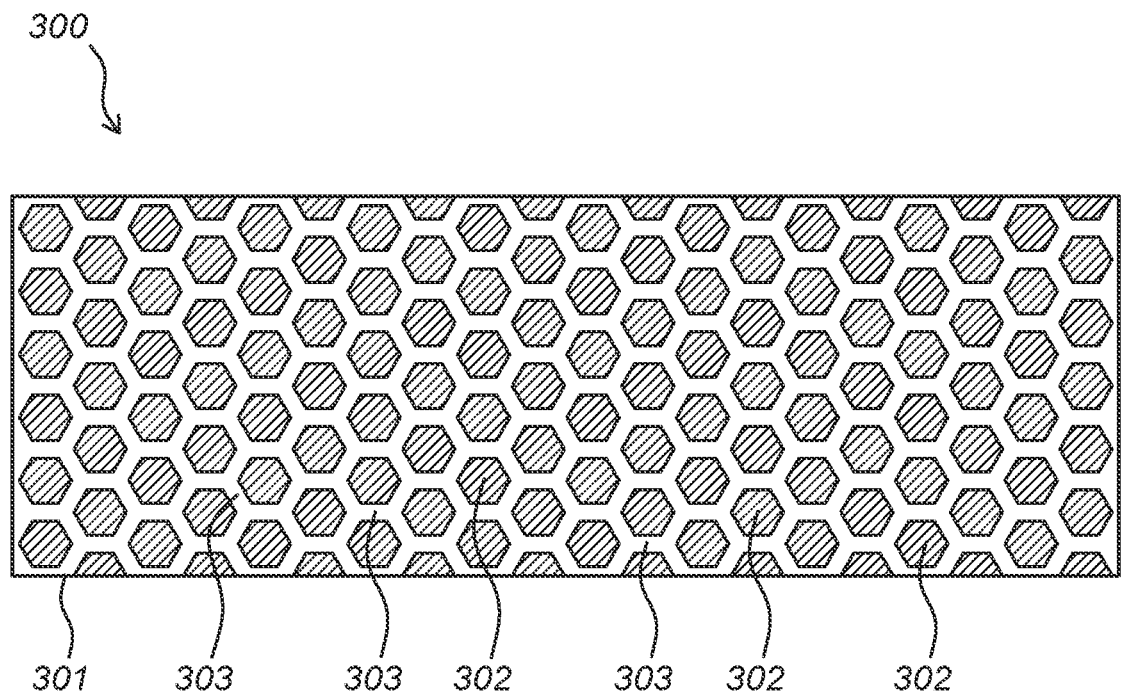
FIG. 3a illustrate a bottom view of another possible embodiment of a panel according to the present invention.

FIG. 3a shows a schematic representations of possible embodiment of a panel 300 according to the present invention. The figure shows a bottom view of the panel 300. The panel comprises a core layer 301 which core layer 301 comprises an upper core layer and a lower core layer. The figures show the bottom surface of the lower core layer. Part of the bottom surface of the core layer 301 is provided with a plurality of cavities 302. The cavities 302 extends towards the top surface of the core layer 301. The cavities 302 are integrally formed cavities 302. In the shown embodiment, the cavities 302 define a cell pattern, in particular a polygon cell pattern. The figure show that the cavities 302 are separated via partitions 303, wherein at least part of the partitions 303 between the cavities 302 have a thickness which is smaller than the length and/or width of the cavities 302. In the shown embodiment, the cavities 302 are thermoformed into the bottom surface of core layer 301.

Figure 3B:
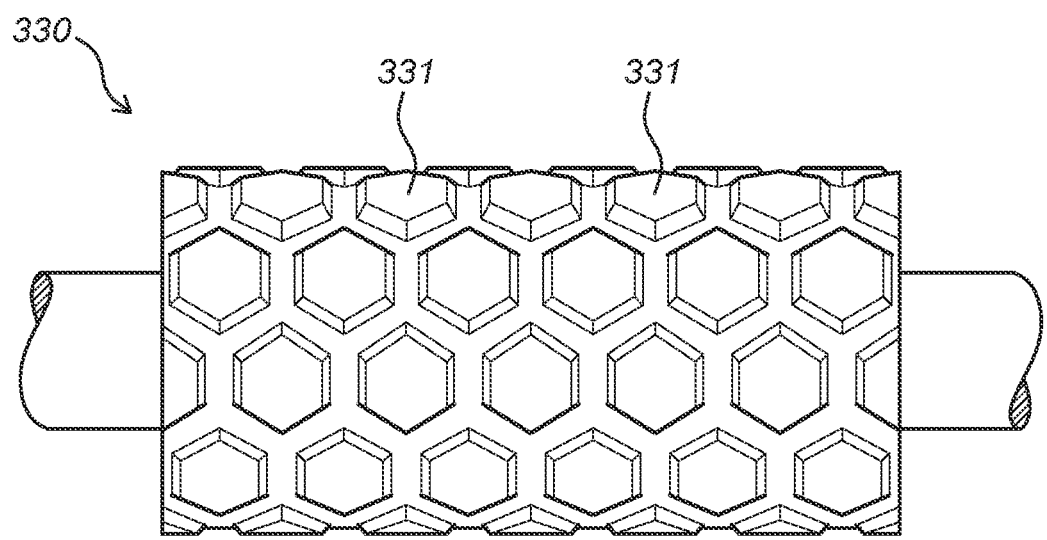
FIG. 3b illustrate a roller which could be applied to manufacture a panel according to the present invention.
Figure 3C:
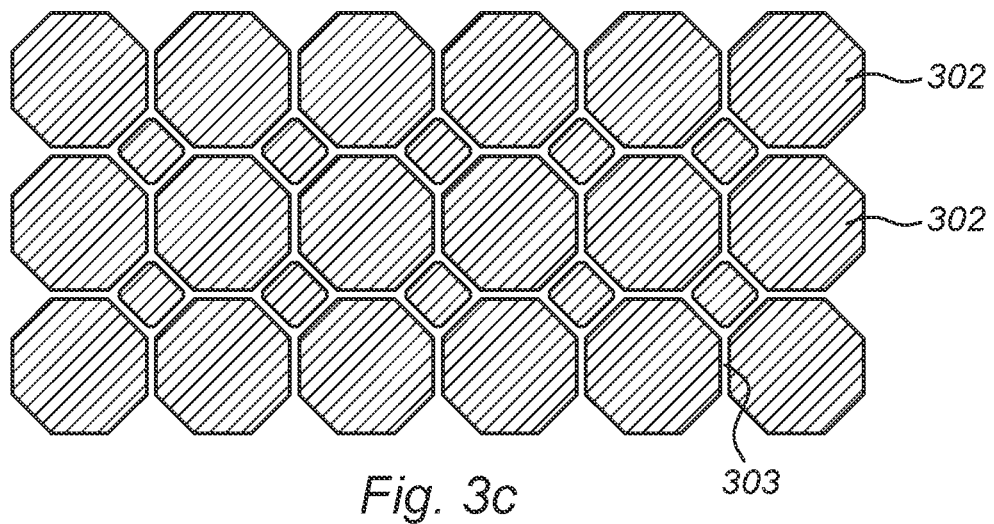
FIGS. 3c-3h illustrate a bottom view of various possible embodiments of a panel according to the present invention.
Figure 3D:
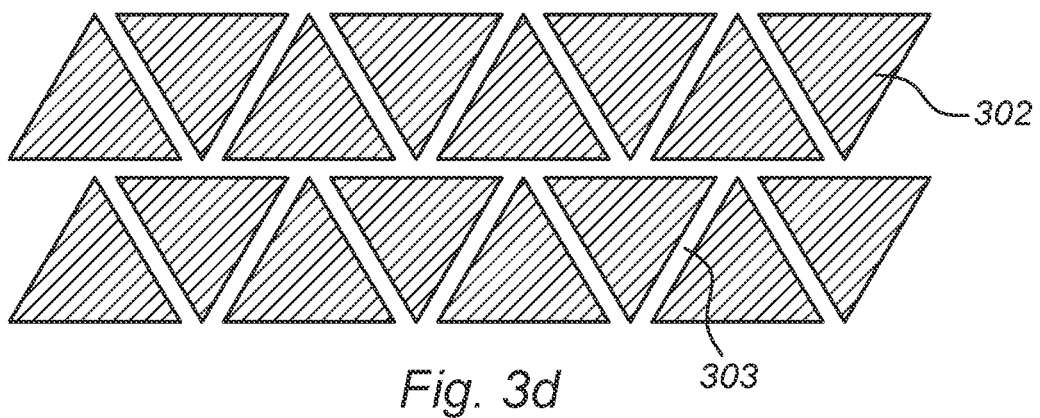
Figure 3E:
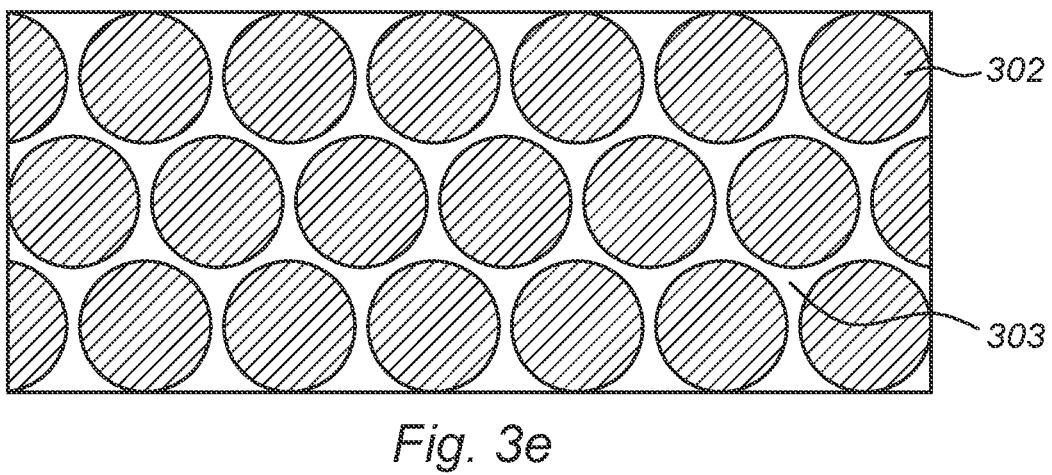
Figure 3F:
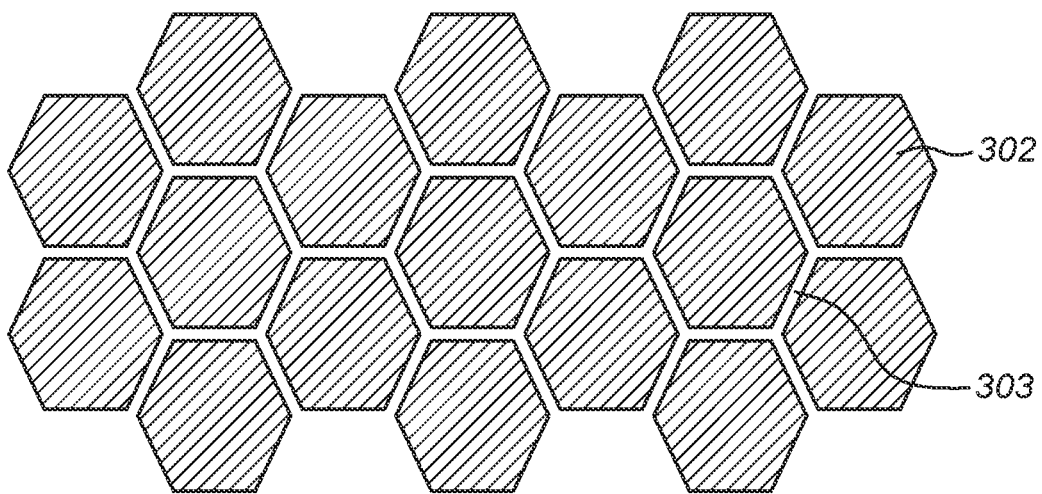
Figure 3G:
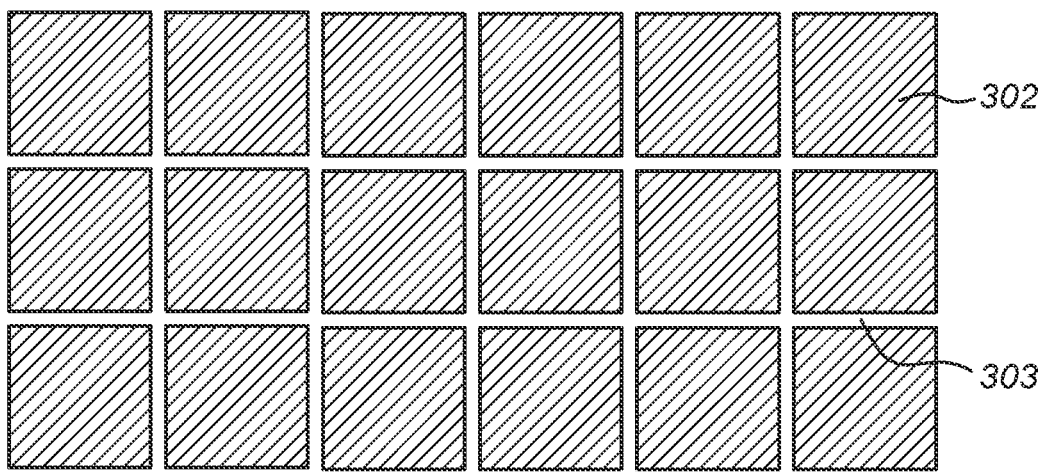
Figure 3H:
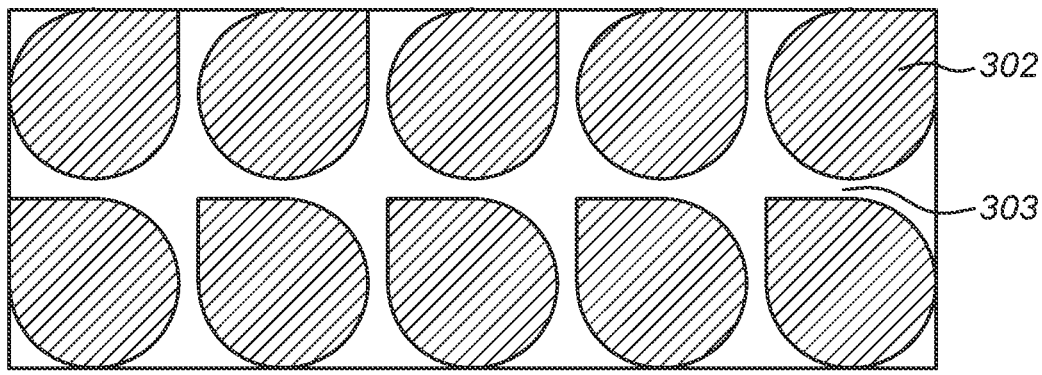
Figure 4A:
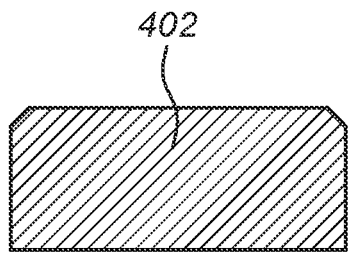
FIGS. 4a-4i illustrate a cross sectional view of various possible embodiments of cavities according to the present invention.
Figure 4B:
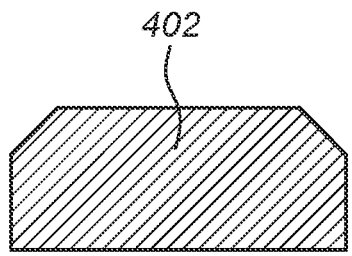
Figure 4C:
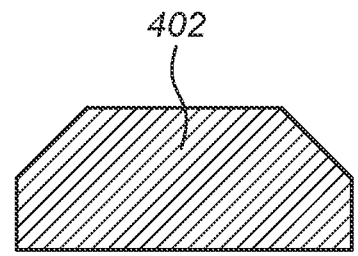
Figure 4D:
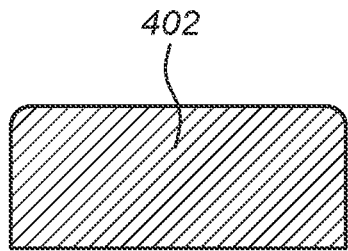
Figure 4E:
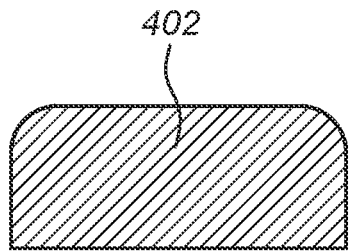
Figure 4F:
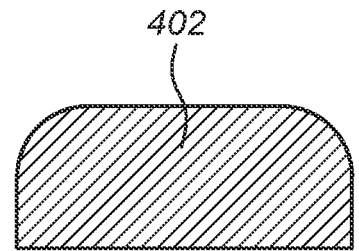
Figure 4G:
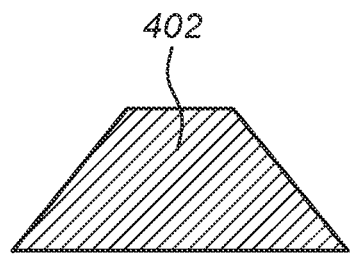
Figure 4H:
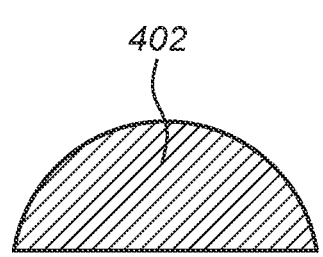
Figure 4I:
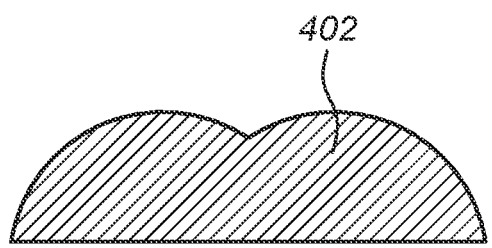

FIG. 3b shows a roller 330 which could be applied to manufacture a panel 300 according to the present invention, in particular as shown in FIG. 3a. The plurality of cavities can be provided by subjecting at least part of the bottom surface of a core layer to a (rotary) imprinting process. This can be done substantially directly after co-extrusion of the core layer, if this technique is applied. It is for example conceivable that the core layer is led trough at least two rollers 330, wherein at least one of the rollers is provided with a surface structure 331 configured to provide a plurality of cavities in at least part of the bottom surface of the core layer.

FIGS. 3c-3h show a bottom view of various further possible embodiments of a panel according to the present invention. The figures are in line with FIG. 3a, and show a bottom view of part of a panel according to the present invention. The figures show for each embodiment a plurality of impressed cavities 302, in particular in a repeated pattern. The cavities 302 are separated via partitions 303, wherein at least part of the partitions 303 between the cavities 302 have a thickness which is smaller than the length and/or width of the cavities 302.

FIGS. 4a-4i show cross sectional views of various possible embodiments of impressed cavities 402 according to the present invention. It can be seen that the cavities 402 have rather clear boundaries, wherefore the cavities 402 could also function as attenuation chambers.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application.

The verb "comprise" and conjugations thereof used in this patent publication are understood to mean not only "comprise", but are also understood to mean the phrases "contain", "substantially consist of", "formed by" and conjugations thereof. When it is referred to reinforcing layer also a reinforcing element can be meant, or vice versa. Within the scope of this invention, where the term 'impressed cavity' is used, also the term 'cavity' could be applied, or vice versa. Where the terms 'impressed' or 'impressing' are applied, also the terms 'depressed' or 'depressing' could be used. The upper core layer and the lower core layer can be integrated core layers. The upper core layer could also be referred to as core layer and the lower core layer as bottom layer.

The invention claimed is:

1. A floor panel, a wall panel or a ceiling panel, comprising:
　at least one core layer, said core layer comprising:
　　at least one upper core layer comprising a first composite material; and
　　at least one lower core layer comprising a second composite material;
　wherein at least part of the bottom surface of the lower core layer is provided with a plurality of impressed cavities, and
　wherein the Vicat softening temperature of the upper core layer is at least 15 degrees Celsius higher than the Vicat softening temperature of the lower core layer.

2. The panel according to claim 1, wherein the lower core layer has a Vicat softening temperature in the range of 50 to 90 degrees Celsius.

3. The panel according to claim 1, wherein the modulus of elasticity of the lower core layer is at most 50% of the modulus of elasticity of the upper core layer.

4. The panel according to claim 1, wherein the upper core layer has a Shore D hardness in the range of 85 to 95 and/or wherein the lower core layer has a Shore D hardness in the range of 55 to 65.

5. The panel according to claim 1, wherein the first composite material comprises at least 40 wt % of a mineral material and/or wherein the second composite material comprises at most 60 wt % of a mineral material.

6. The panel according to claim 1, wherein the first composite material and/or the second composite material comprises at least one mineral material selected from the group consisting of: magnesium oxide, magnesium chloride, magnesium oxy sulphate, calcium carbonate, chalk, clay, calcium silicate and/or talc.

7. The panel according to claim 1, wherein the first composite material and/or the second composite material comprises at least one thermoplastic material selected from the group consisting of: polyvinyl chloride, polystyrene, polyethylene, polyurethane, acrylonitrile butadiene styrene, polypropylene, phenolic, melamine or formaldehyde resins or combinations thereof.

8. The panel according to claim 1, wherein the core layer comprises at least one binder, wherein the ratio of weight percentages of mineral material relative to said binder is at least 1.

9. The panel according to claim 1, wherein the transition temperature of the lower core layer is at least 10 degrees Celsius lower than the transition temperature of the upper core layer.

10. The panel according to claim 1, wherein the upper core layer and the lower core layer are formed via co-extrusion.

11. The panel according to claim 1, wherein the cavities are formed during an extrusion process, or immediately after an extrusion process, or through hot-pressing, or through a curing process and wherein the plurality of impressed cavities define a repeated cavity pattern.

12. The panel according to claim 1, wherein the core layer comprises at least one pair of opposing edges, said pair of opposing side edges comprising complementary coupling parts configured for mutual coupling of adjacent panels.

13. The panel according to claim 1, wherein the density of the lower core layer is lower than the density of the upper core layer.

14. The panel according to claim 1, wherein the lower core layer is at least partially foamed.

15. The panel according to claim 1, comprising at least one decorative top layer, which is either directly or indirectly, affixed to the core layer.

16. A method for producing a floor panel, a wall panel, or a ceiling panel, comprising the steps of:
providing a first composite material;
providing a second composite material, wherein the Vicat softening temperature of the first composite material is at least 15 degrees Celsius higher than the Vicat softening temperature of the second composite material;
forming a core layer comprising an upper core layer comprising said first composite material and a lower core layer comprising said second composite material, wherein said core layer comprises a top surface and a bottom surface,
impressing a plurality of cavities in at least part of the bottom surface of the core layer, and;
enabling hardening and/or curing of the core layer.

17. The method according to claim 16, wherein the core layer is formed via co-extrusion.

18. The method according to claim 16, wherein at least part of cavities is obtained via imprinting, rotary imprinting and/or rotary die cutting.

19. The method according to any claim 16, wherein impressing of the core layer is performed by guiding the core layer trough at least two rollers, wherein at least one of the rollers is provided with a surface structure configured to provide a plurality of cavities in at least part of the bottom surface of the core layer.

20. The method according to claim 16, wherein the second composite material has a Vicat softening temperature in the range of 50 to 90 degrees Celsius.

* * * * *